(12) United States Patent
Cook

(10) Patent No.: US 8,978,202 B2
(45) Date of Patent: Mar. 17, 2015

(54) LEG CAP AND CASTER MOUNTING HARDWARE

(71) Applicant: Jeffrey A. Cook, Dripping Springs, TX (US)

(72) Inventor: Jeffrey A. Cook, Dripping Springs, TX (US)

( * ) Notice: Subject to any disclaimer, the term of this patent is extended or adjusted under 35 U.S.C. 154(b) by 0 days.

(21) Appl. No.: 14/085,665

(22) Filed: Nov. 20, 2013

(65) Prior Publication Data

US 2014/0137371 A1     May 22, 2014

Related U.S. Application Data

(60) Provisional application No. 61/728,737, filed on Nov. 20, 2012.

(51) Int. Cl.
*B60B 33/00*     (2006.01)

(52) U.S. Cl.
CPC .......... *B60B 33/0007* (2013.01); *B60B 33/0023* (2013.01); *B60B 2200/22* (2013.01); *B60B 2900/113* (2013.01)
USPC .............................. 16/29; 16/18 R; 29/896.07

(58) Field of Classification Search
USPC ............. 16/18 R, 29, 30, 43, 45; 248/346.11, 248/188.9; 312/249.8; 29/525.02, 898.07; 297/463.1
See application file for complete search history.

(56) References Cited

U.S. PATENT DOCUMENTS

| | | | | |
|---|---|---|---|---|
| 940,780 | A * | 11/1909 | Bent ................................. | 16/43 |
| 959,108 | A * | 5/1910 | Bent ................................. | 16/43 |
| 1,090,675 | A * | 3/1914 | Bell ................................... | 16/29 |
| 1,429,187 | A * | 9/1922 | Bunker ............................. | 16/19 |
| 1,471,247 | A * | 10/1923 | Dietz .......................... | 280/79.11 |
| 1,532,064 | A | 6/1924 | Neiswender | |
| 1,530,525 | A * | 3/1925 | Schultz ............................. | 16/29 |
| 1,542,231 | A * | 6/1925 | Garfield ........................... | 16/24 |
| 1,835,144 | A * | 12/1931 | Cleaveland ....................... | 16/34 |
| 2,072,132 | A * | 3/1937 | Herold et al. .................... | 16/43 |
| 2,175,317 | A * | 10/1939 | Rogers ............................. | 16/30 |
| 2,753,586 | A * | 7/1956 | Metz ............................ | 16/18 R |
| 3,104,493 | A * | 9/1963 | Nalle ......................... | 248/188.4 |
| 3,722,026 | A | 3/1973 | Wilhelmi | |
| 5,010,621 | A * | 4/1991 | Bock ................................ | 16/39 |
| 5,330,064 | A * | 7/1994 | Hall .............................. | 211/182 |
| 5,575,036 | A * | 11/1996 | May ................................ | 16/34 |
| 5,666,887 | A * | 9/1997 | Grabowski et al. ............ | 108/91 |
| 5,733,032 | A * | 3/1998 | Bolta et al. ................. | 362/217.14 |
| 5,742,977 | A * | 4/1998 | Hoofe, III ........................ | 16/30 |
| 5,934,639 | A * | 8/1999 | Chiang et al. ............ | 248/346.11 |
| 6,219,882 | B1 * | 4/2001 | Olson .......................... | 16/42 R |
| 6,826,800 | B2 * | 12/2004 | Kao ............................... | 16/31 R |
| 6,865,774 | B2 | 3/2005 | Devine et al. | |
| 6,866,338 | B2 * | 3/2005 | Mendenhall et al. ......... | 297/239 |
| 7,287,732 | B2 * | 10/2007 | Balistreri ................... | 248/188.4 |
| 7,374,186 | B2 | 5/2008 | Mason et al. | |

(Continued)

*Primary Examiner* — William Miller
(74) *Attorney, Agent, or Firm* — Craig M. Stainbrook; Stainbrook & Stainbrook, LLP

(57) ABSTRACT

A leg cap and caster mounting apparatus having a base with a leg-engaging top side and a bottom side, a center hole extending through said base from said bottom side to said top side, and a perimeter wall defining an open top and extending vertically and upwardly from said base and having an exterior side and a leg-engaging interior side, said open top sized to accept the end of a table or furniture leg. The top side includes a nut well shaped to accommodate a nut and to prevent said nut from turning when a threaded shank of a caster wheel assembly is threadably inserted into said nut. A method of capping a table or furniture leg and installing a caster wheel assembly is also disclosed.

4 Claims, 10 Drawing Sheets

(56) References Cited

U.S. PATENT DOCUMENTS 7,610,655 B2 * 11/2009 Thaw et al. .................. 16/42 R
7,610,682 B2   11/2009 Polevoy et al.
2004/0163208 A1 *  8/2004 Kuo ................................. 16/29
2011/0302740 A1 * 12/2011 Martenson et al. ............... 16/46

* cited by examiner

LEG CAP AND CASTER MOUNTING HARDWARE

CROSS REFERENCES TO RELATED APPLICATIONS

The present application claims the benefit of U.S. Provisional Patent Application Ser. No. 61/728,737, filed (Nov. 20, 2012).

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

BACKGROUND OF THE INVENTION

FIELD OF THE INVENTION

The present invention relates generally to furniture casters, and more particularly to methods of installing casters on furniture legs, and still more particularly to a leg cap that provides a quick and generally foolproof method of installing a caster on a the end of a furniture leg, such as a table or chair leg.

BACKGROUND DISCUSSION

Caster assemblies are well known. Various means and apparatus for affixing casters to furniture and table legs are also well known. Table and furniture casters may be permanently affixed or removable, though most are generally intended as a permanent part of the article. Known caster assemblies that reside generally in the field of the present invention include:

U.S. Pat. No. 1,532,064, to Neiswender, which teaches a bracket for attaching casters to furniture legs. Two angular members are slidably connected together upon a bearing cap in order to adapt to the furniture leg dimensions. The horizontal portions contain slots through which the spindle of the caster may pass. The vertical portions contact two of the furniture leg surfaces and contain apertures for affixing the bracket to the leg with screws.

U.S. Pat. No. 3,722,026, to Wilhelmi, which discloses a furniture glide system featuring the insertion of a hollow shoe into a leg of greater diameter than the shoe. Shoe is inserted by force into a cavity substantially prepared in dimensions similar to the shoe. Shank projects upward beyond shoe when fully assembled, into a further prepared recess within the leg. Height of furniture is adjustable by adjustment of the threaded shank's degree of insertion into the prepared recess.

U.S. Pat. No. 5,575,036, to May, which discloses a wheel for facilitating rolling of a table over a ground surface. The inventive device includes a mounting assembly for securing to a lower end of a table leg. A wheel support assembly is pivotally mounted to the mounting assembly and supports a wheel beneath the table leg. Comprised of a horizontal mounting plate with opposing flanges for securing to the sides of the table leg.

U.S. Pat. No. 6,865,774, to Devine et al, which shows a device for attaching a caster to a frame. It comprises a two-sided frame, each side disposed at an angle to the other. Between each side is positioned a mounting plate for insertion of a caster. Each side contains mounting holes for attaching to the inner edge of frames by inserting suitable screws. Preferred embodiments mount inside of filing cabinets and shelves.

U.S. Pat. No. 7,374,186, to Mason et al, which teaches removable casters for mounting to a variety of heavy items such as refrigeration cases or electrical distribution equipment. The removable casters comprise a horizontal flat plate with diametrically opposed, vertical side brackets. Side brackets bear apertures for securing caster to heavy items, such that they may be positioned in multiple locations on the heavy items.

Finally, U.S. Pat. No. 7,610,682, to Polevoy et al, which disloses a method of affixing a caster onto a wooden or plastic furniture leg. A recess is formed in the proximal end of the leg, and a housing for receiving the caster is inserted into the recess. Means are provided for preventing contact of the rollers with the housings while under load.

The foregoing patents reflect the current state of the art of which the present inventor is aware. Reference to, and discussion of, these patents is intended to aid in discharging Applicant's acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

BRIEF SUMMARY OF THE INVENTION

The present invention is a method and apparatus for installing a caster wheel assembly on the end of a table or furniture leg. The apparatus includes a leg cap and caster mounting apparatus having a base portion with an open top sized to slip over the end of the leg with generally close tolerances. The cap includes a generally planar base portion with a leg-engaging side, a ground-facing side, and a throughhole disposed in the geometric center of the base portion. A perimeter wall extending generally vertically and upwardly from the base portion defines the open top into which the leg is placed during installation. The wall has an exterior side and a leg-engaging interior side and may include a plurality of fastener holes through which fasteners are passed to secure the cap to the leg end.

The leg-engaging top side of the base portion includes a nut well shaped (typically hexagonally) to accommodate a nut of a predetermined size and to prevent the nut from turning when the threaded shank of a caster wheel assembly is threadably inserted into the nut. The nut well is concentric with the base portion center hole and may include an inverted layer cake shape when seen in profile so as to accommodate a plurality of nut sizes, in a manner well known in the art. The base portion may include a plurality of reinforcing ribs disposed across the upper surface of the top side of the base portion, and the nut well may be set into the ribs; or the nut well may be recessed into the solid base itself.

A method of capping a table or furniture leg and installing a caster wheel assembly is thereby provided, inasmuch as installation involves, simply, placing the cap over the end of a furniture or table leg a leg; drilling a pilot hole or marking the location for a shank hole in the bottom of the leg using the center hole as a guide, the hole sized to accept the threaded shank of a caster wheel assembly; removing the cap from the leg; placing a properly sized nut in the nut well (sized, that is, for a threaded shank of a predetermined size; providing a caster wheel having a threaded shank of the predetermined size; and threadably inserting and screwing the threaded shank of the caster wheel into the nut and tightening it so as to create a leg cap and caster assembly; and placing the leg cap and caster assembly over the leg end by inserting the threaded shank into the drilled hole. If fastener holes are provided through the base and/or the perimeter wall, nails or screws may be used to secure the leg cap and caster wheel assembly to the leg end.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

BRIEF DESCRIPTION OF SEVERAL VIEWS OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
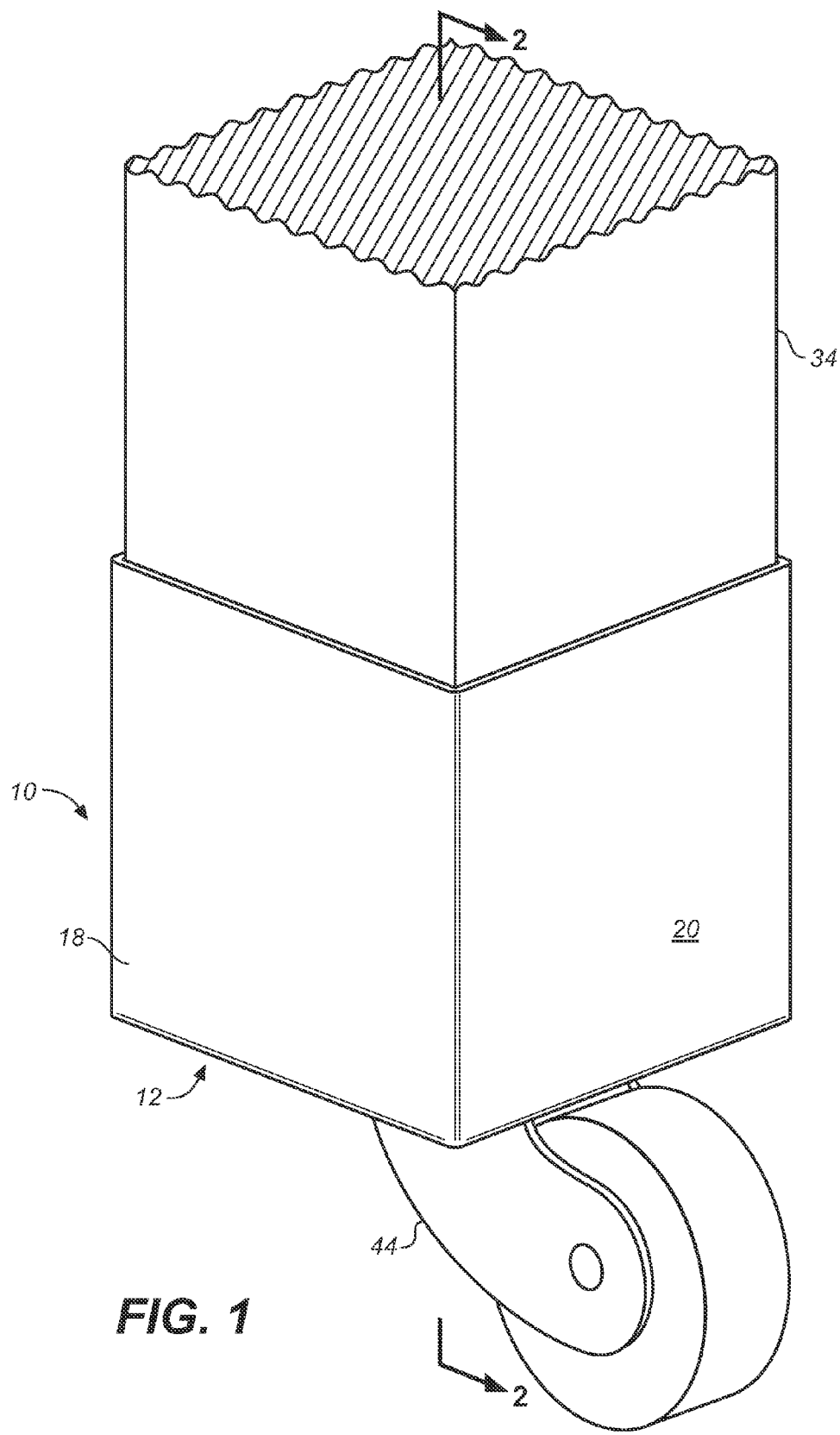
FIG. 1 is an upper perspective view of the inventive leg cap and caster wheel mounting hardware of the present invention, shown mounted on a generic furniture leg.
Figure 2:
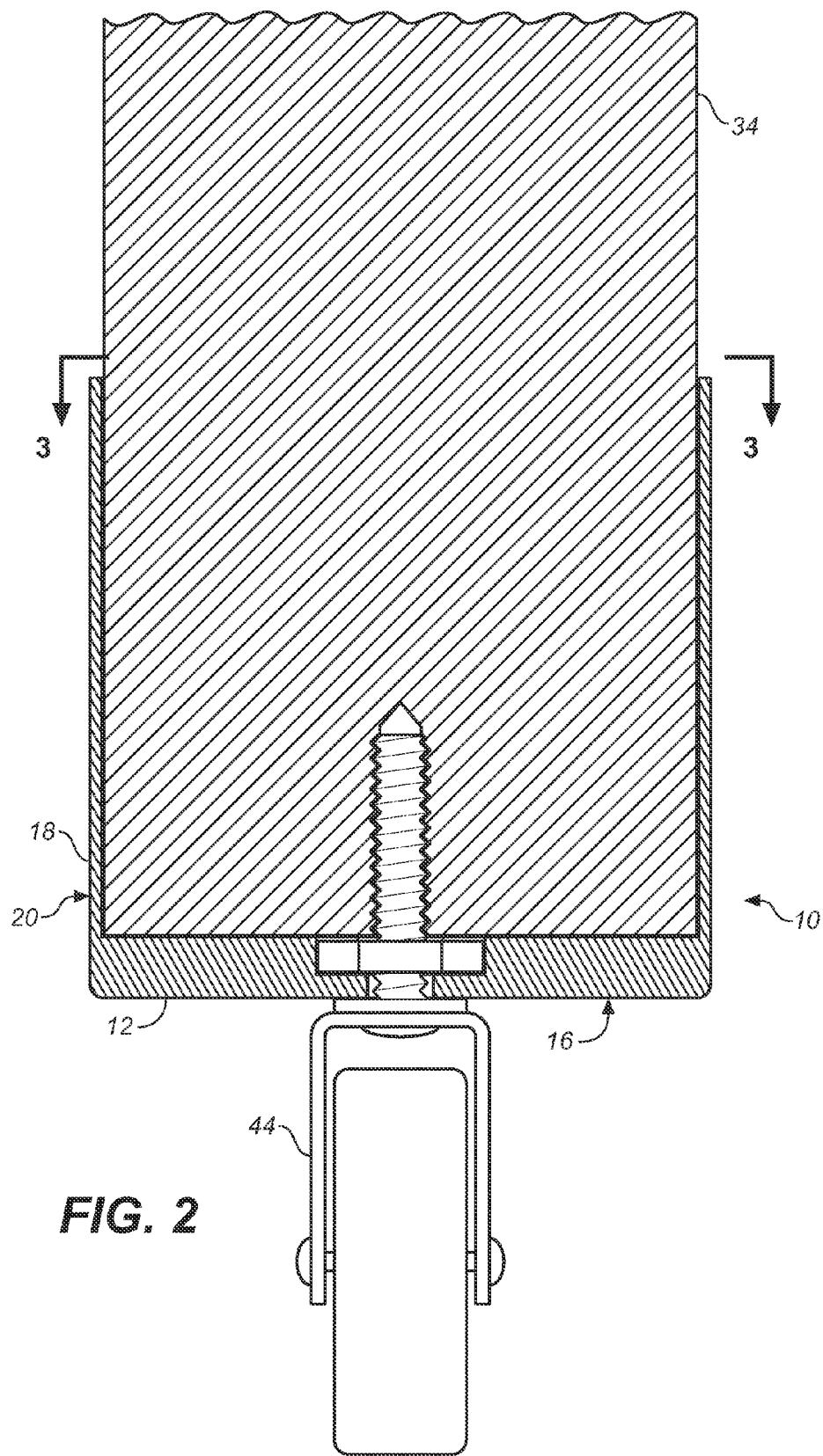
FIG. 2 is cross-sectional side view in elevation thereof taken along section line 2-2 of FIGS. 1 and 3.
Figure 3:
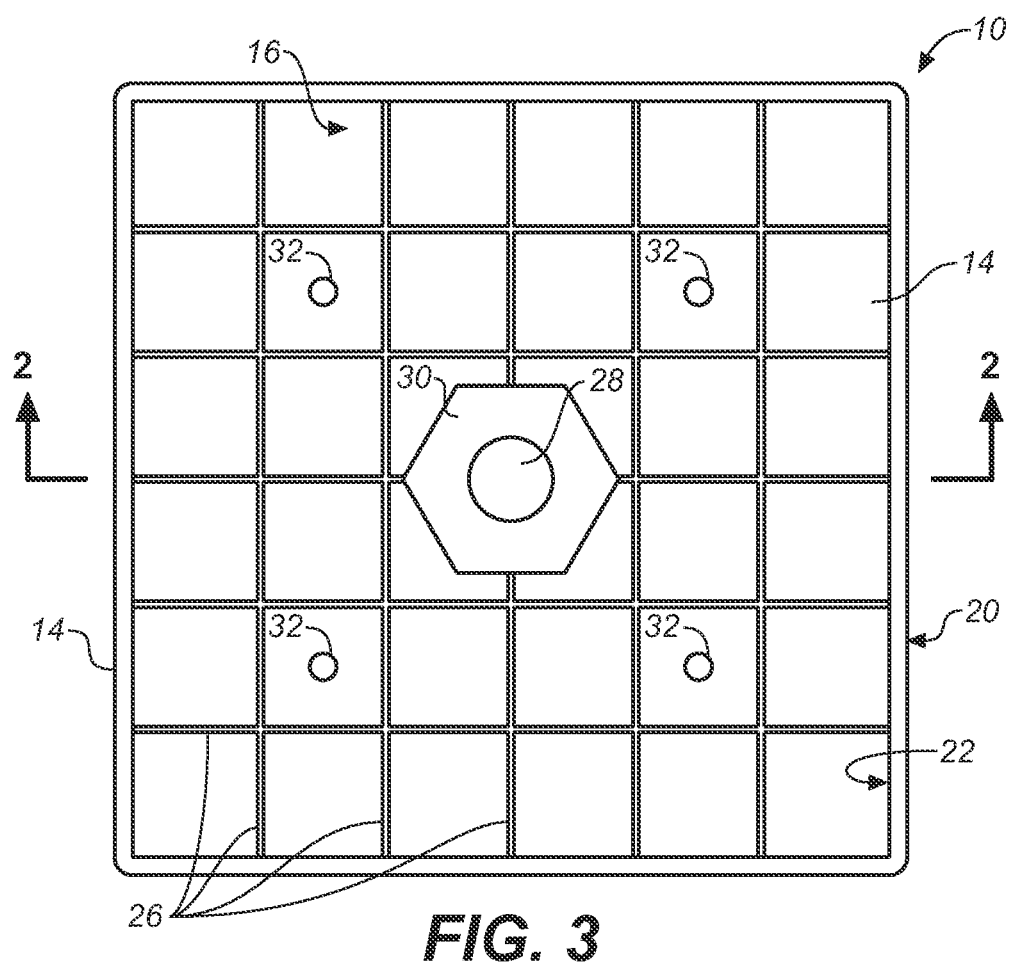
FIG. 3 is a top plan view of the inventive apparatus, shown standing alone and removed from a furniture leg and without a caster wheel included, this view taken along section line 3-3 of FIG. 2.
Figure 4:
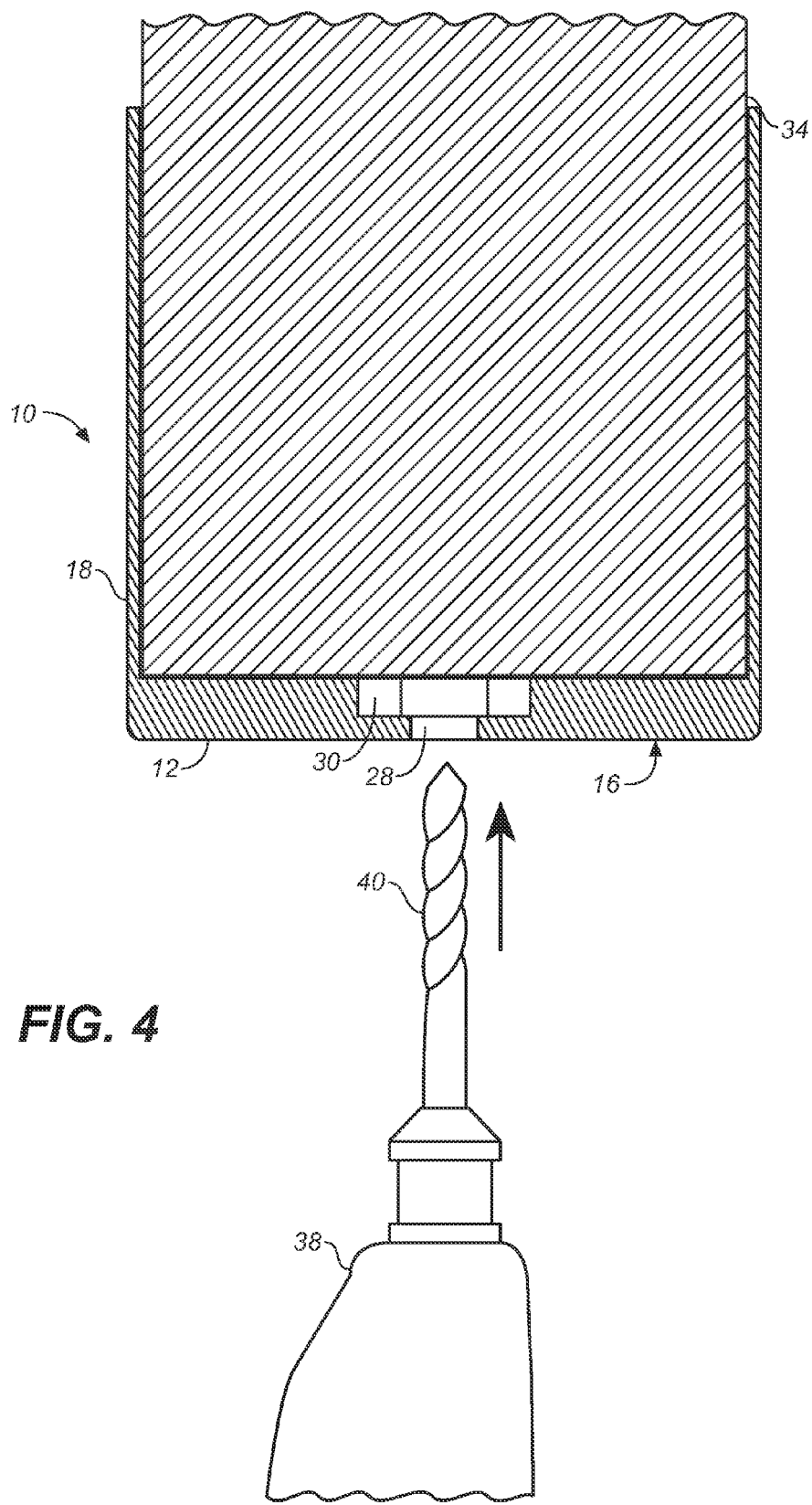
FIG. 4 is a cross-sectional side view in elevation showing a first step in using the inventive leg cap and caster mounting hardware to install a caster wheel to a table or furniture leg, this view showing a drill poised for preparing a pilot hole in a furniture leg.
Figure 5:
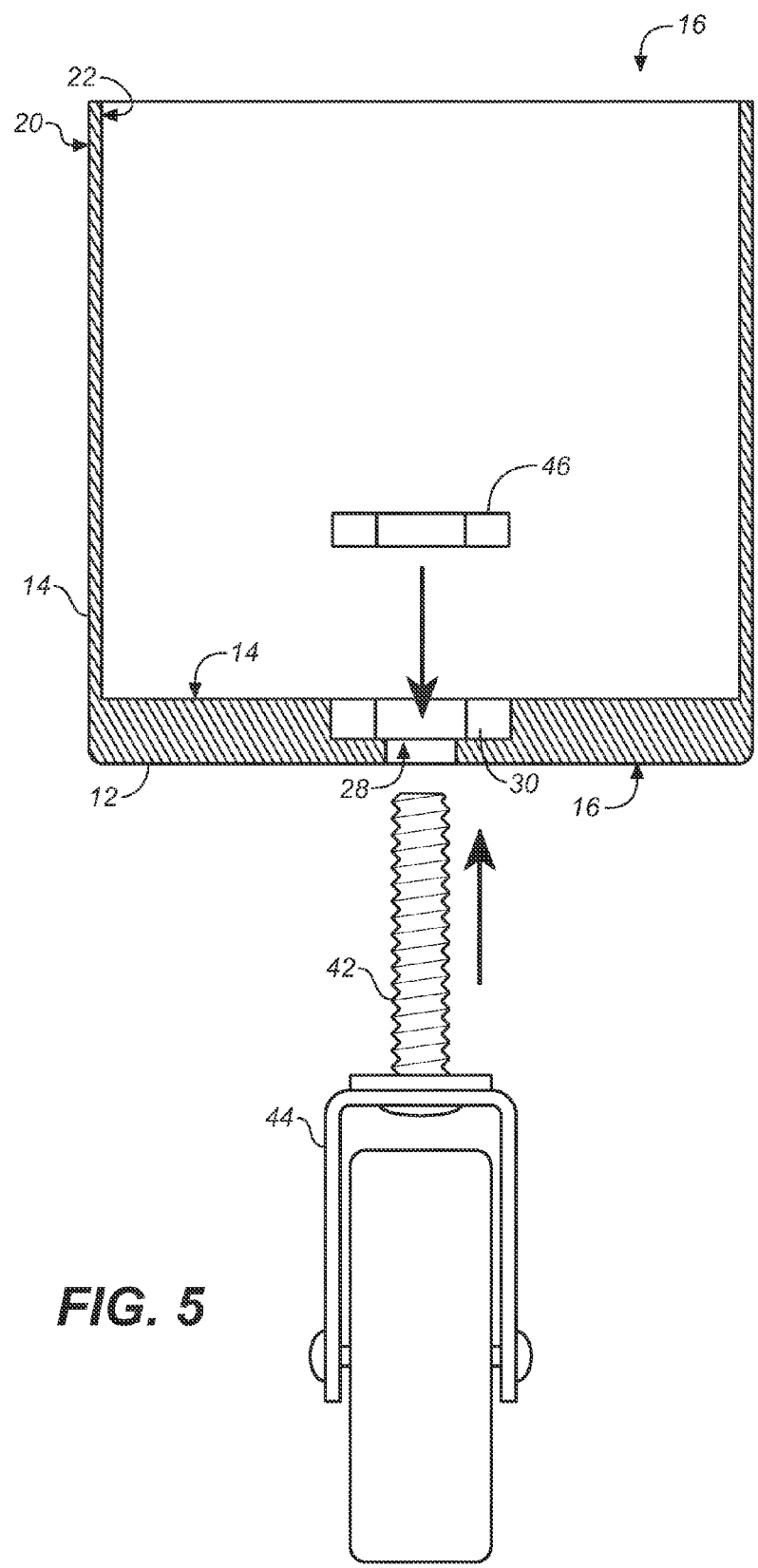
FIG. 5 is a cross-sectional side view in elevation showing the second step in using the inventive apparatus for the caster and leg cap hardware installation.
Figure 6:
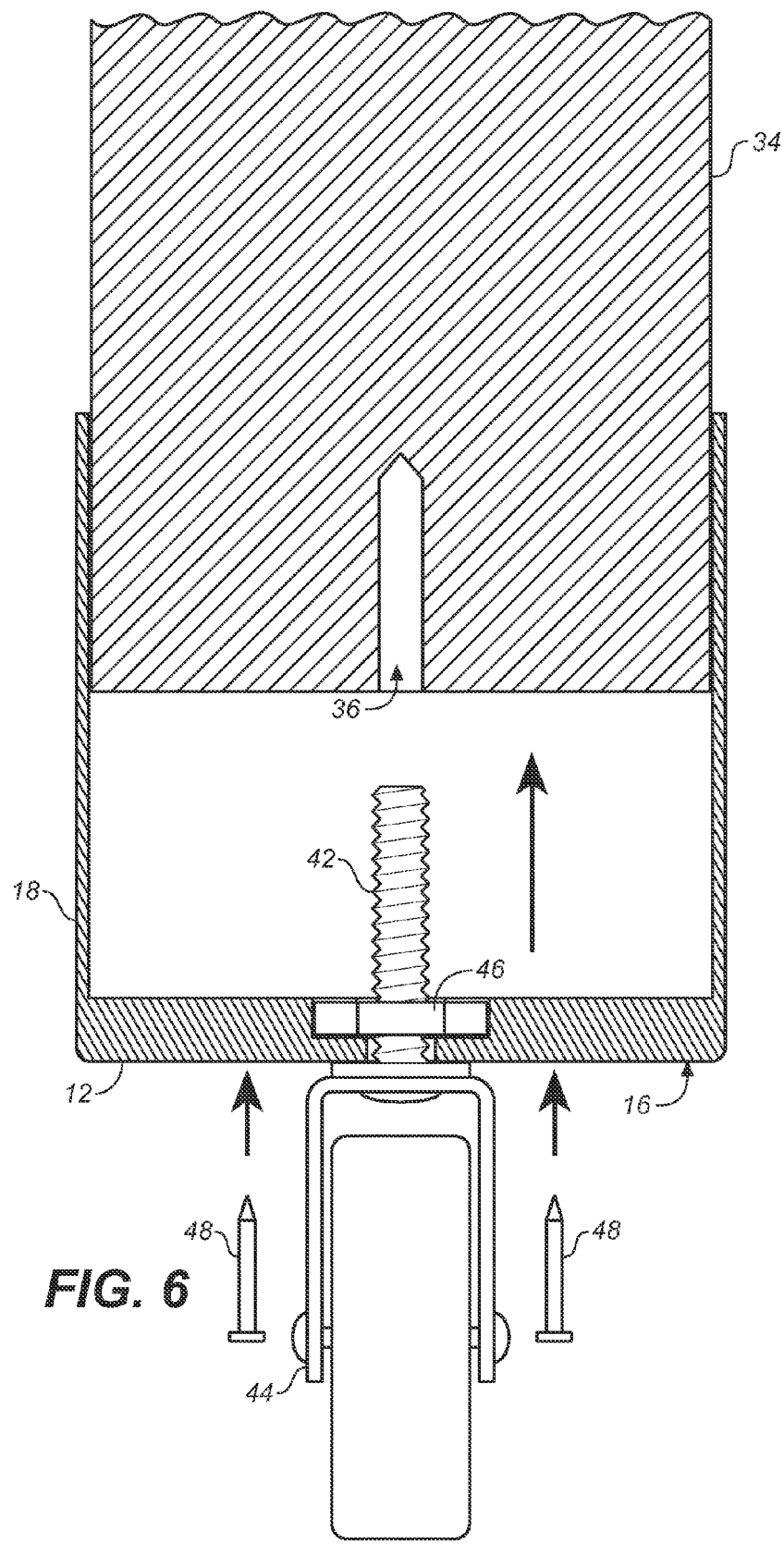
FIG. 6 is a cross-sectional side view in elevation showing a third step.
Figure 7:
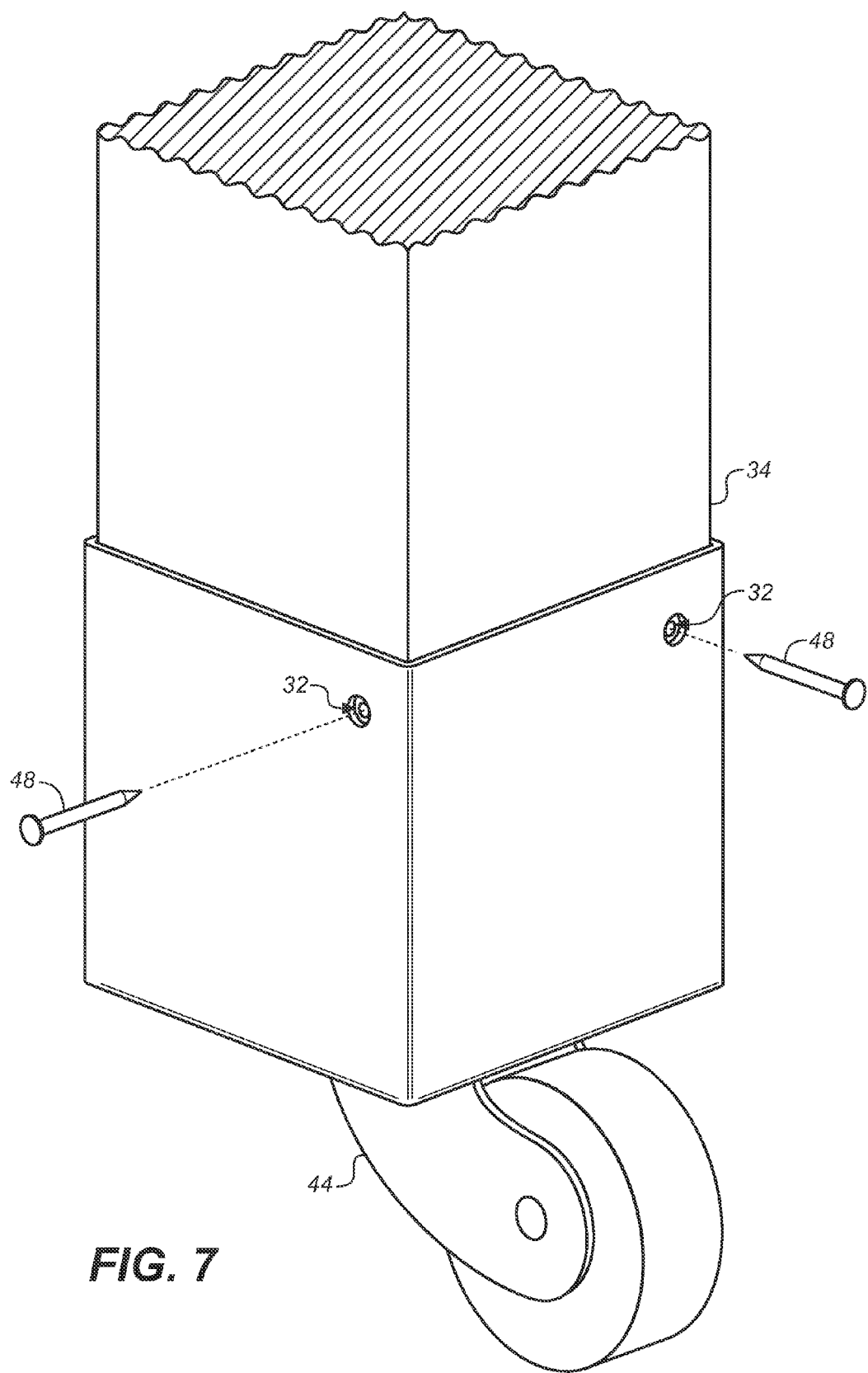
FIG. 7 is a cross-sectional side view in elevation showing a final step in using the inventive apparatus for a caster and caster hardware installation.

Referring first to FIGS. 1 through 3, wherein like reference numerals refer to like components in the various views, there is illustrated therein a new and improved leg cap, caster wheel assembly, and caster wheel mounting hardware, generally denominated 10 herein.

FIGS. 1-3 collectively illustrate a first preferred embodiment of the inventive apparatus, showing that the apparatus comprises a leg cap including a base 12 having a top side 14 and a bottom side 16; and a perimeter wall 18 having an exterior side 20 and an interior side 22. The perimeter wall extends generally vertically or normal in relation to the plane of top side of the base, though a geometry involving a slight outward taper or angle is also entirely consistent with the invention and does not alter its performance. The open top 24 is sized according to article model to accept the end of a leg 34.

When viewed from above (see FIG. 3), it will be seen that the top side of the base includes reinforcement ribs 26 extending across the top side in a configuration, such as a grid matrix, and upwardly a portion of the vertical dimension of the perimeter wall(s) 18. A center hole 28 is disposed in the geometric center of the cap, and a well or recess 30 is provided to accommodate a nut which will eventually be used to secure the threaded shank of a caster wheel assembly. A plurality of nail or screw holes 32 is disposed in either or both of the base and the perimeter wall.

FIGS. 4-7 illustrate the method steps involved in capping a leg with the leg cap and caster mounting hardware. Looking first at FIG. 4, it is seen that the cap 10 is placed over the lower end of the leg 34. Using the center hole 28 as a guide, a hole 36 is drilled in the leg using a drill 38 having a bit 40 sized to accept the threaded shank 42 of a caster wheel assembly 44. The cap is then removed from the leg (FIG. 5) and a nut 46 is placed in the well 30. The threaded shank of the caster wheel assembly is screwed into the nut and tightened, and the cap and caster combination (FIG. 6) is then placed over the leg end by inserting the threaded shank into the drilled hole 36. Nails 48 are then driven into the leg and the cap thereby secured.

In this way, a caster wheel can be easily and permanently or removably installed in the center of a table or furniture leg. The cap provides the means for centering the pilot hole and for aligning the drill bit during drilling. The same centering and alignment hole 28 then provides the threadable coupling for the caster shank 42.

Figure 8A:
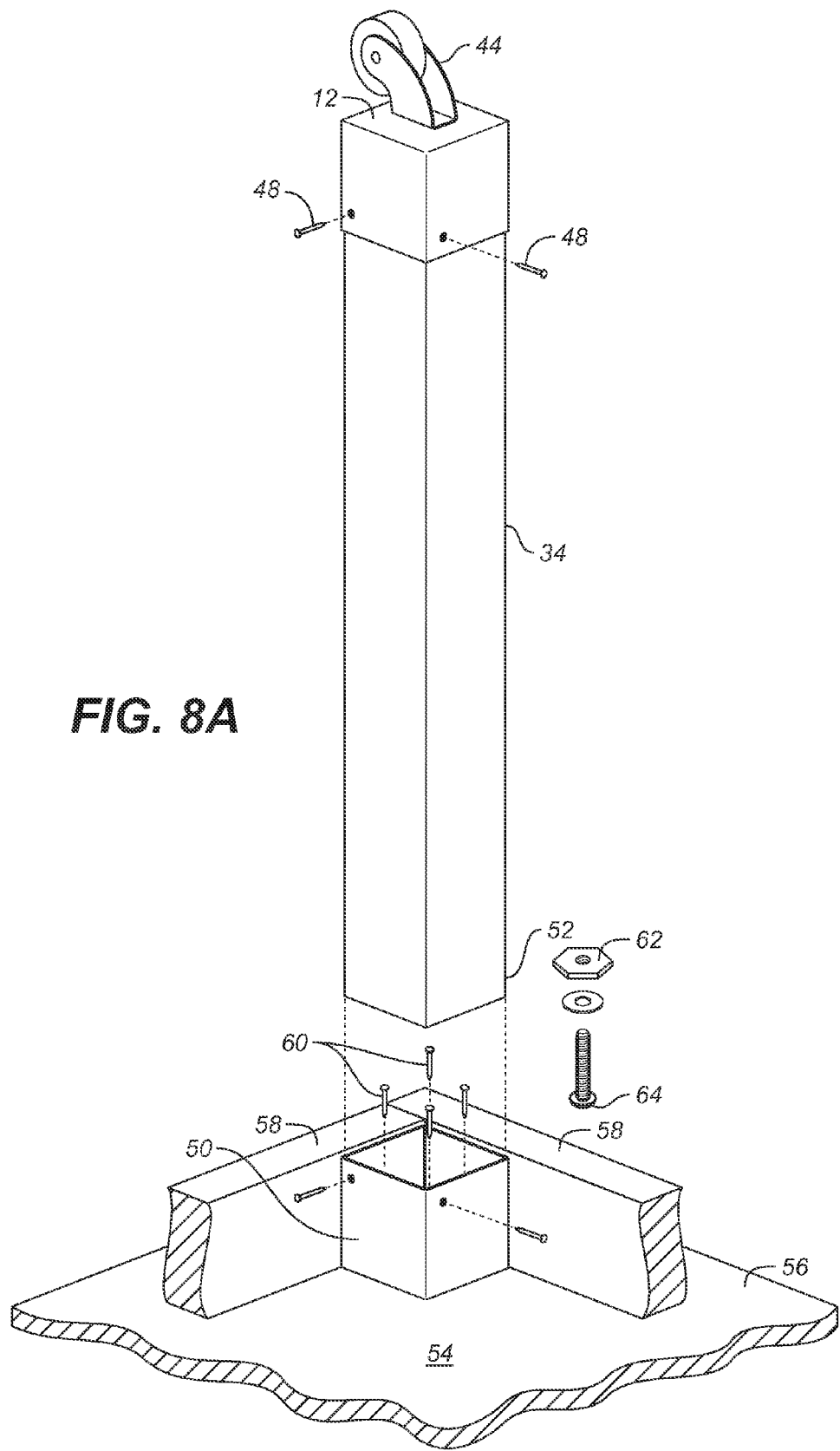
FIG. 8A is a lower perspective view showing the leg cap inverted and poised for use to affix a table leg to the underside of a table top.
Figure 8B:
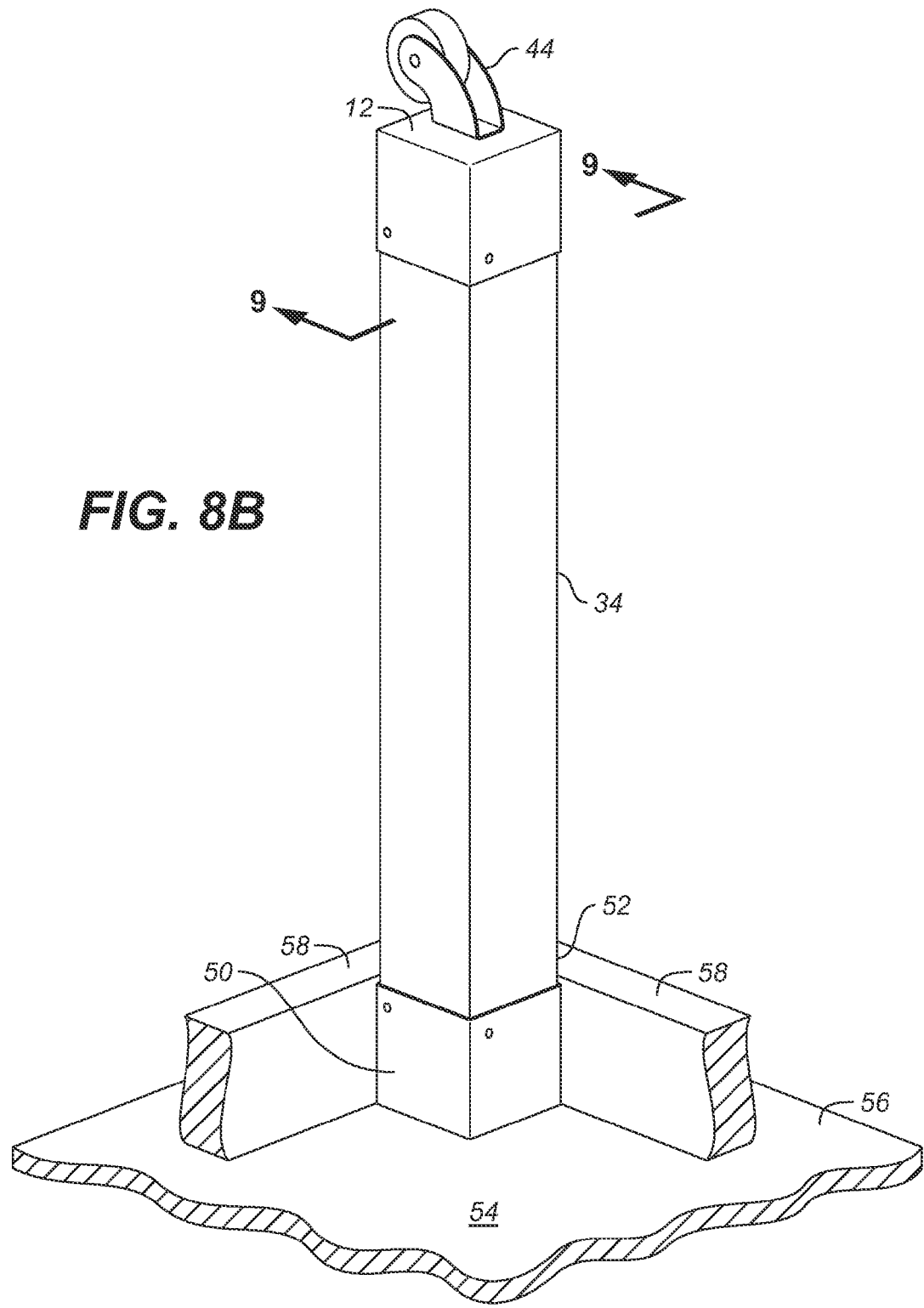
FIG. 8B is a lower perspective view showing the table leg inserted into the inverted leg cap.
Figure 9:
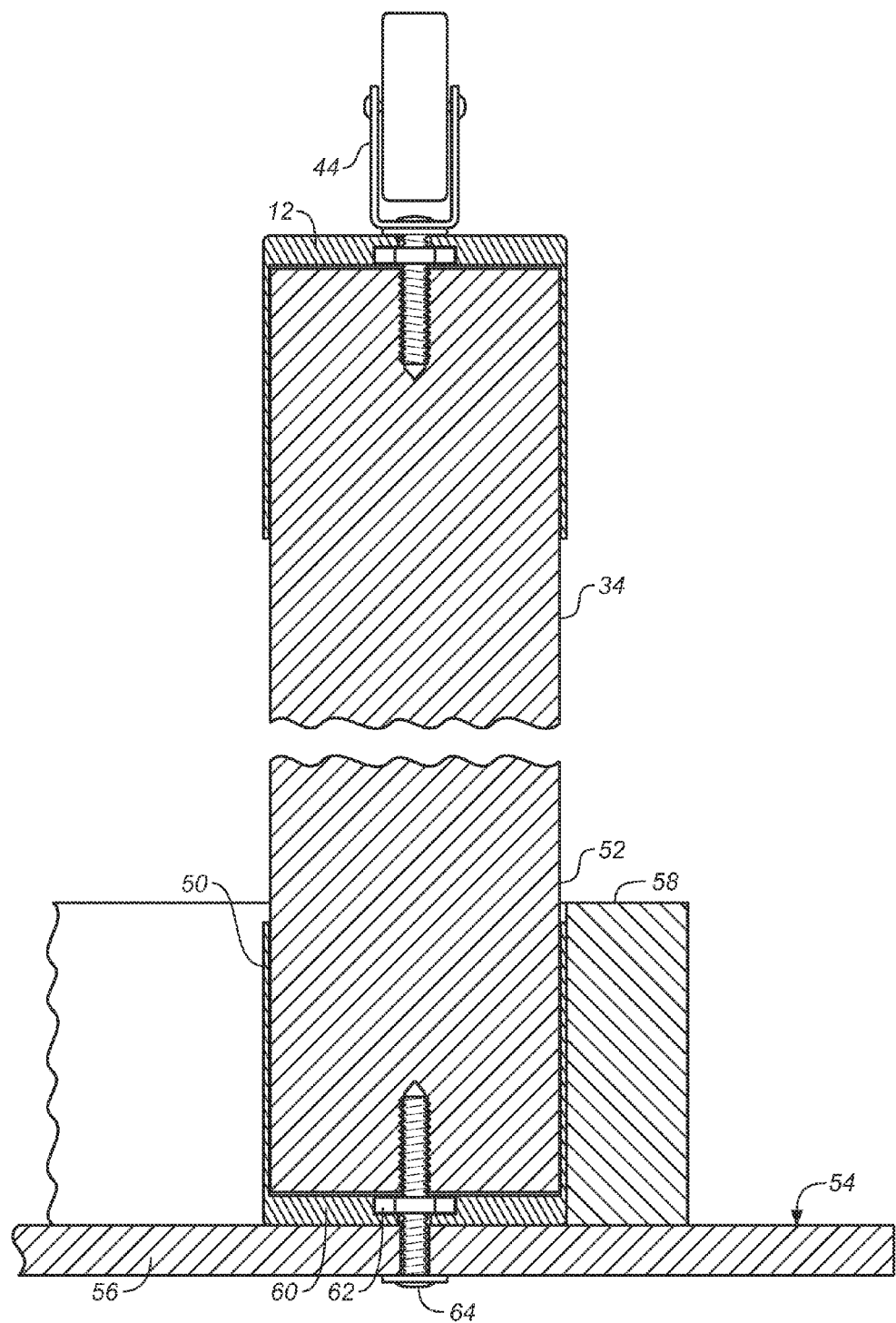
FIG. 9 is a cross-sectional side view in elevation take along section line 9-9 of FIG. 8B, this view showing the table leg attached to a table top with a lag bolt.

Referring now to FIGS. 8A-9 there is shown a second complementary use of the leg cap of the present invention. In this instance the leg cap 50 functions as a receptacle for inserting the upper end 52 of a table leg 34 where it is connected to the underside 54 of a table top 56 or rolling bench top. The precise same leg cap employed for mounting a caster wheel is employed, in this instance simply inverted such that the open top is facing away from the underside 54 of the table top.

In a simple installation, the leg cap 50 is placed at the corner of an apron or skirt 58. A pilot hole is marked or drilled using the center hole in the leg cap base portion. The cap is optionally removed and a full bolt hole is drilled through the table top. The leg cap is again placed at the skirt corner and nails 60 or other fasteners may be driven through holes in the cap base and/or the side of the cap to hold it in place in the corner. When secured, a nut 62 is placed in the nut well of the base portion and a lag bolt 64 is passed through the table top and into the nut and the leg upper end of the leg to threadably secure the leg to the table top.

Accordingly, and from the foregoing, it will be seen that in its most essential aspect, the inventive leg cap and caster mounting hardware will first be seen to comprise a base having a leg-engaging top side and a bottom side, a center hole extending through the base from the bottom side to the top side, and a perimeter wall defining an open top and extending vertically and upwardly from the base and having an exterior side and a leg-engaging interior side, the open top sized to accept the end of a table or furniture leg; herein the top side includes a nut well shaped to accommodate a nut and to prevent the nut from turning when a threaded shank of a caster wheel assembly is threadably inserted into the nut.

Further, the inventive apparatus provides a novel method of capping and installing a caster wheel assembly on the end of a table or furniture leg, the method including the steps of (1) placing over the end of a furniture or table leg a leg cap having a base with a leg-engaging top side and a bottom side, a center hole extending through the base from the bottom side to the top side, and a perimeter wall defining an open top and extending vertically and upwardly from the base having an exterior side and a leg-engaging interior side, the open top sized to accept the end of a table or furniture leg, wherein the top side includes a nut well shaped to accommodate a nut and to prevent the nut from turning when the threaded shank of a caster wheel assembly is threadably inserted into the nut; (2) marking or drilling a hole in the leg using the center hole as a guide, the hole sized to accept the threaded shank of a caster wheel assembly; (3) removing the cap from the leg; (4) placing a nut in the nut well; (5) providing a caster wheel having a threaded shank; (6) threadably inserting and screwing the threaded shank of the caster wheel into the nut and tightening it so as to create a leg cap and caster assembly; and (7) placing the leg cap and caster assembly over the leg end by inserting the threaded shank into the drilled hole. The same leg cap used to mount a caster wheel assembly can be used to secure a table leg to a table.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A method of capping a table or furniture leg and mounting a caster wheel thereon, said method comprising the steps of:
    (a) placing over an end of the furniture or table leg a leg cap having a base portion with a leg-engaging top side and a ground-facing bottom side, a center hole extending through the base portion from the bottom side to the top side, and a perimeter wall defining an open top and extending vertically and upwardly from the base portion and having an exterior side and the leg-engaging interior side, the open top sized to accept the end of the table or furniture leg, wherein the top side includes a nut well shaped to accommodate a nut and to prevent the nut from turning when a threaded shank of the caster wheel is threadably inserted into the nut;
    (b) marking a shank hole location in the leg using the center hole as a guide, the hole sized to accept the threaded shank of the caster wheel;
    (c) removing the cap from the leg;
    (d) drilling a hole in the bottom of the leg of sufficient diameter to accommodate the threaded shank of the caster wheel having a predetermined size;
    (e) placing the nut in the nut well;
    (f) providing the caster wheel having the threaded shank;
    (g) threadably inserting and screwing the threaded shank of the caster wheel into the nut and tightening it so as to create a leg cap and caster assembly; and
    (h) placing the leg cap and caster assembly over the leg end by inserting the threaded shank into the drilled hole.

2. The method of claim 1, wherein the perimeter wall includes fastener holes, and further including the step of placing fasteners into the leg through the fastener holes.

3. The method of claim 1, wherein the step (b) marking step involves drilling a pilot hole through the center hole of the base portion while the leg cap is disposed over the end of the leg.

4. The method of claim 1, wherein the step (b) marking step involves marking the shank hole location with a marker.

* * * * *